(12) United States Patent
Dugan (10) Patent No.: US 11,173,340 B2
(45) Date of Patent: *Nov. 16, 2021

(54) SYSTEMS AND METHODS FOR MEASURING AND/OR ANALYZING SWING INFORMATION

(71) Applicant: Dugan Patents, LLC, Sleepy Hollow, NY (US)

(72) Inventor: Brian M. Dugan, Sleepy Hollow, NY (US)

(73) Assignee: Dugan Patents, LLC, Sleepy Hollow, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,069

(22) Filed: Sep. 15, 2020

(65) Prior Publication Data

US 2020/0406099 A1 Dec. 31, 2020

Related U.S. Application Data

(63) Continuation of application No. 15/968,304, filed on May 1, 2018, now Pat. No. 10,799,757, which is a (Continued)

(51) Int. Cl.
*A63B 69/36* (2006.01)
*A63B 24/00* (2006.01)
(Continued)

(52) U.S. Cl.
CPC ...... *A63B 24/0006* (2013.01); *A63B 24/0003* (2013.01); *A63B 69/36* (2013.01);
(Continued)

(58) Field of Classification Search
CPC ............ A63B 2220/40; A63B 2225/50; A63B 24/0062; A63B 24/0003;
(Continued)

(56) References Cited

U.S. PATENT DOCUMENTS

| 3,717,857 A | 2/1973 | Evans |
| 3,788,647 A | 1/1974 | Evans |

(Continued)

OTHER PUBLICATIONS

U.S. Appl. No. 17/029,033, filed Sep. 1, 2020, Dugan.
(Continued)

*Primary Examiner* — Nini F Legesse
(74) *Attorney, Agent, or Firm* — Dugan & Dugan, PC (57) ABSTRACT

In a first aspect, a method for monitoring a golf swing is provided that includes coupling a mobile telephone to a golf club and employing the mobile telephone coupled to the golf club to monitor acceleration of the mobile telephone as the mobile telephone swings while a user swings the golf club, collect acceleration information based on the monitored acceleration of the mobile telephone as the mobile telephone swings, analyze the collected acceleration information to determine one or more characteristics of the golf swing based on the collected acceleration information, and output information regarding the one or more characteristics of the golf swing on the display of the mobile telephone. Numerous other aspects are provided.

20 Claims, 5 Drawing Sheets

Related U.S. Application Data continuation of application No. 15/394,803, filed on Dec. 29, 2016, now Pat. No. 9,975,001, which is a continuation of application No. 14/338,341, filed on Jul. 22, 2014, now Pat. No. 9,566,495, which is a continuation of application No. 13/846,908, filed on Mar. 18, 2013, now Pat. No. 8,808,114, which is a continuation of application No. 12/696,040, filed on Jan. 28, 2010, now Pat. No. 8,430,770, which is a continuation-in-part of application No. 11/869,695, filed on Oct. 9, 2007, now Pat. No. 8,337,335.

(60) Provisional application No. 61/148,028, filed on Jan. 28, 2009, provisional application No. 60/828,635, filed on Oct. 7, 2006.

(51) Int. Cl.

| | | |
|---|---|---|
| *H04M 1/72403* | (2021.01) | |
| *A63B 69/38* | (2006.01) | |
| *A63B 71/06* | (2006.01) | |
| *H04W 4/02* | (2018.01) | |
| *A63B 102/02* | (2015.01) | |

(52) U.S. Cl.
CPC ...... *A63B 69/3608* (2013.01); *A63B 69/3623* (2013.01); *A63B 69/3632* (2013.01); *A63B 69/38* (2013.01); *A63B 71/0619* (2013.01); *H04M 1/72403* (2021.01); *H04W 4/027* (2013.01); *A63B 2071/0625* (2013.01); *A63B 2071/0627* (2013.01); *A63B 2071/0661* (2013.01); *A63B 2071/0663* (2013.01); *A63B 2071/0691* (2013.01); *A63B 2102/02* (2015.10); *A63B 2208/0204* (2013.01); *A63B 2209/10* (2013.01); *A63B 2220/40* (2013.01); *A63B 2220/836* (2013.01); *A63B 2225/20* (2013.01); *A63B 2225/50* (2013.01)

(58) Field of Classification Search
CPC .... A63B 2071/0694; A63B 2071/0625; A63B 24/0021; A63B 71/0622; A63B 2220/44; A63B 60/42; A63B 69/00; A63B 71/0619; A63B 2024/0012; A63B 2024/0068; A63B 2102/32; A63B 2220/13; A63B 2220/24; A63B 2220/833; A63B 2071/0663; A63B 2102/02; A63B 2102/24; A63B 2220/16; A63B 2230/00; A63B 57/00; A63B 60/46; A63B 69/32
USPC ...................................................... 473/223
See application file for complete search history.

(56) References Cited

U.S. PATENT DOCUMENTS

| | | |
|---|---|---|
| 3,815,427 A | 6/1974 | Gladstone |
| 4,991,850 A | 2/1991 | Wilhlem |
| 5,056,783 A | 10/1991 | Matcovich et al. |
| 5,174,577 A | 12/1992 | Warde et al. |
| 5,221,088 A | 6/1993 | McTeigue et al. |
| 5,233,544 A | 8/1993 | Kobayashi |
| 5,257,084 A | 10/1993 | Marsh |
| 5,688,183 A | 11/1997 | Sabatino et al. |
| 5,694,340 A | 12/1997 | Kim |
| 5,741,182 A | 4/1998 | Lipps et al. |
| 5,911,635 A | 6/1999 | Ogden |
| 6,045,364 A | 4/2000 | Dugan |
| 6,173,610 B1 | 1/2001 | Pace |
| 6,261,102 B1 | 7/2001 | Dugan et al. |
| 6,811,516 B1 | 11/2004 | Dugan |
| 6,819,247 B2 | 11/2004 | Birnbach et al. |
| 7,021,140 B2* | 4/2006 | Perkins .................. A01K 87/00 473/219 |
| 7,736,242 B2 | 6/2010 | Stites |
| 7,922,586 B2 | 4/2011 | Heckendorf |
| 7,946,926 B1 | 5/2011 | Balardeta et al. |
| 8,337,335 B2* | 12/2012 | Dugan ............... A63B 69/3623 473/409 |
| 8,430,770 B2* | 4/2013 | Dugan ............... A63B 69/3623 473/409 |
| 8,808,102 B2* | 8/2014 | Dugan ............... A63B 69/3623 473/223 |
| 8,808,114 B2* | 8/2014 | Dugan ............... A63B 69/3623 473/409 |
| 9,566,495 B2* | 2/2017 | Dugan ............... A63B 69/3623 |
| 9,731,182 B2* | 8/2017 | Dugan ............... A63B 69/3623 |
| 9,975,001 B2* | 5/2018 | Dugan ............... A63B 69/3623 |
| 10,201,739 B2 | 2/2019 | Dugan |
| 10,799,757 B2* | 10/2020 | Dugan .................. A63B 69/36 |
| 2001/0048364 A1 | 12/2001 | Kalthoff et al. |
| 2002/0019677 A1 | 2/2002 | Lee |
| 2002/0072815 A1 | 6/2002 | McDonough |
| 2003/0207718 A1 | 11/2003 | Perlmutter |
| 2005/0032525 A1 | 2/2005 | Gasbarro |
| 2005/0215340 A1 | 9/2005 | Stites et al. |
| 2005/0288119 A1 | 12/2005 | Wang et al. |
| 2006/0025229 A1 | 2/2006 | Mahajan et al. |
| 2007/0021269 A1 | 1/2007 | Shum |
| 2007/0111811 A1 | 5/2007 | Grober |
| 2007/0135225 A1 | 6/2007 | Nieminen et al. |
| 2009/0231960 A1 | 9/2009 | Hutcheson |
| 2009/0298605 A1 | 12/2009 | Wiegers |
| 2010/0049468 A1 | 2/2010 | Papadourakis |
| 2010/0130298 A1 | 5/2010 | Dugan et al. |
| 2010/0222152 A1 | 9/2010 | Jaekel et al. |
| 2011/0151986 A1 | 6/2011 | Denton et al. |
| 2011/0224012 A1 | 9/2011 | Hashimoto |
| 2012/0052972 A1 | 3/2012 | Bentley |
| 2012/0286114 A1* | 11/2012 | Jertson ............... A63B 69/3632 248/219.4 |
| 2012/0289354 A1 | 11/2012 | Cottam |
| 2013/0095940 A1 | 4/2013 | Dugan |
| 2013/0150121 A1* | 6/2013 | Jeffery ................... H04W 4/00 455/556.1 |
| 2013/0165246 A1* | 6/2013 | Jeffery ............... A63B 69/3623 473/223 |
| 2013/0225335 A1 | 8/2013 | Dugan |
| 2014/0018181 A1* | 1/2014 | Blake ................. A63B 24/0006 473/277 |
| 2014/0335965 A1 | 11/2014 | Dugan |
| 2014/0335978 A1 | 11/2014 | Dugan |
| 2017/0106237 A1 | 4/2017 | Dugan |
| 2017/0348580 A1 | 12/2017 | Dugan |
| 2018/0243609 A1 | 8/2018 | Dugan |
| 2019/0143190 A1 | 5/2019 | Dugan |

OTHER PUBLICATIONS

Notice of Allowance of U.S. Appl. No. 08/858,824 dated Sep. 1, 1998.
Notice of Abandonment of U.S. Appl. No. 08/858,824 dated Feb. 3, 1999.
Withdrawal of Notice of Allowance of U.S. Appl. No. 08/858,824 dated May 11, 1999.
Notice of Allowance of U.S. Appl. No. 08/858,824 dated Jul. 30, 1999.
Office Action of U.S. Appl. No. 11/869,695 dated Nov. 17, 2009.
Feb. 17, 2010 Response to Office Action of U.S. Appl. No. 11/869,695 dated Nov. 17, 2009.
Final Office Action of U.S. Appl. No. 11/869,695 dated May 26, 2010.
Interview Summary of U.S. Appl. No. 11/869,695, filed Feb. 3, 2010.
Interview Summary of U.S. Appl. No. 11/869,695, filed Feb. 17, 2010.
Amendment After Final submitted with ROE of U.S. Appl. No. 11/869,695, filed Aug. 26, 2010.

(56) References Cited

OTHER PUBLICATIONS

Office Action of U.S. Appl. No. 11/869,695 dated Oct. 18, 2010.
Mar. 18, 2011 Response to Office Action of U.S. Appl. No. 11/869,695 dated Oct. 18, 2010.
Final Office Action of U.S. Appl. No. 11/869,695 dated Jun. 21, 2011.
Amendment Submitted with ROE of U.S. Appl. No. 11/869,695, filed Dec. 21, 2011.
Office Action of U.S. Appl. No. 11/869,695 dated Feb. 16, 2012.
Aug. 16, 2012 Response to Office Action of U.S. Appl. No. 11/869,695.
Notice of Non-Compliant Amendment of U.S. Appl. No. 11/869,695 dated Aug. 21, 2012.
Aug. 23, 2012 Response to Notice of Non-Compliant Amendment of U.S. Appl. No. 11/869,695.
Notice of Allowance of U.S. Appl. No. 11/869,695 dated Sep. 18, 2012.
Office Action of U.S. Appl. No. 12/696,040 dated Jun. 8, 2011.
Nov. 8, 2011 Response to Office Action of U.S. Appl. No. 12/696,040.
Final Office Action of U.S. Appl. No. 12/696,040 dated Jan. 18, 2012.
Examiner Interview Summary of U.S. Appl. No. 12/696,040 dated Jul. 2, 2012.
Amendment Submitted with RCE of U.S. Appl. No. 12/696,040, filed Jul. 18, 2012.
Notice of Allowance of U.S. Appl. No. 12/696,040 dated Jul. 27, 2012.
Interview Summary of U.S. Appl. No. 12/696,040, filed Nov. 26, 2012.
Notice of Allowance of U.S. Appl. No. 12/696,040 dated Nov. 29, 2012.
Office Action of U.S. Appl. No. 13/708,928 dated Mar. 1, 2013.
Aug. 30, 2013 Reply to Mar. 1, 2013 Office Action of U.S. Appl. No. 13/708,928.
Final Office Action of U.S. Appl. No. 13/708,928 dated Nov. 6, 2013.
Amendment Submitted with ROE of U.S. Appl. No. 13/708,928, filed Apr. 7, 2014.
Office Action of U.S. Appl. No. 13/846,908 dated Jan. 29, 2013.
Apr. 29, 2014 Reply to Office Action and Terminal Disclaimers of U.S. Appl. No. 13/846,908.
Office Action of U.S. Appl. No. 13/708,928 dated May 16, 2014.
Terminal Disclaimers of U.S. Appl. No. 13/846,908, filed Jun. 4, 2014.
Jun. 5, 2014 Reply to Office Action and Terminal Disclaimer of U.S. Appl. No. 13/708,928.
Notice of Allowance of U.S. Appl. No. 13/708,928 dated Jul. 1, 2014.
Notice of Allowance of U.S. Appl. No. 13/846,908 dated Jul. 3, 2014.
Preliminary Amendment of U.S. Appl. No. 14/338,341, filed Aug. 23, 2014.
Non-Final Office Action of U.S. Appl. No. 14/338,341, filed Jan. 20, 2016.
Non-Final Office Action of U.S. Appl. No. 14/337,206 dated Feb. 1, 2016.
Jul. 20, 2016 Reply to Jan. 20, 2016 Non-Final Office Action of U.S. Appl. No. 14/338,341.
Aug. 1, 2016 Reply to Feb. 1, 2016 Non-Final Office Action of U.S. Appl. No. 14/337,206.
Final Office Action of U.S. Appl. No. 14/337,206 dated Sep. 27, 2016.
Notice of Allowance of U.S. Appl. No. 14/338,341 dated Sep. 29, 2016.
Dec. 27, 2016 Reply to Sep. 27, 2016 Final Office Action and Terminal Disclaimers of U.S. Appl. No. 14/337,206.
Non-Final Office Action of U.S. Appl. No. 15/394,803 dated Aug. 24, 2017.
Non-Final Office Action of U.S. Appl. No. 15/666,549 dated Jan. 12, 2018.
Nov. 24, 2017 Reply and Terminal Disclaimers to Aug. 24, 2017 Non-Final Office Action of U.S. Appl. No. 15/394,803.
Notice of Allowance of U.S. Appl. No. 15/394,803 dated Jan. 19, 2018.
May 14, 2018 Reply to Jan. 12, 2018 Non-Final Office Action of U.S. Appl. No. 15/666,549.
Notice of Allowance of U.S. Appl. No. 15/666,549 dated Sep. 24, 2018.
Non-Final Office Action of U.S. Appl. No. 15/968,304 dated Jun. 19, 2019.
Non-Final Office Action of U.S. Appl. No. 16/243,046 dated Jul. 17, 2019.
Nov. 19, 2019 Reply to Jun. 12, 2019 Non-Final Office Action of U.S. Appl. No. 15/968,304.
Nov. 18, 2019 Reply to Jul. 17, 2019 Non-Final Office Action of U.S. Appl. No. 16/243,046.
Jan. 23, 2020 Notice of Allowance of U.S. Appl. No. 15/968,304.
Jan. 23, 2020 Notice of Allowance of U.S. Appl. No. 16/243,046.
Amendment submitted with ROE of U.S. Appl. No. 15/968,304, filed Apr. 23, 2020.
Amendment submitted with RCE of U.S. Appl. No. 16/243,046, filed Apr. 23, 2020.
Jun. 11, 2020 Notice of Allowance of U.S. Appl. No. 15/968,304.
Jun. 11, 2020 Notice of Allowance of U.S. Appl. No. 16/243,046.
312 Amendment of U.S. Appl. No. 15/968,304, filed Sep. 11, 2020.

\* cited by examiner

SYSTEMS AND METHODS FOR MEASURING AND/OR ANALYZING SWING INFORMATION

The present application is a continuation of and claims priority to U.S. patent application Ser. No. 15/968,304, filed May 1, 2018 and titled "SYSTEMS AND METHODS FOR MEASURING AND/OR ANALYZING SWING INFORMATION", which is a continuation of and claims priority to U.S. patent application Ser. No. 15/394,803, filed Dec. 29, 2016, now U.S. Pat. No. 9,975,001 and titled "SYSTEMS AND METHODS FOR MEASURING AND/OR ANALYZING SWING INFORMATION", which is a continuation of and claims priority to U.S. patent application Ser. No. 14/338,341, filed Jul. 22, 2014, now U.S. Pat. No. 9,566,495 and titled "SYSTEMS AND METHODS FOR MEASURING AND/OR ANALYZING SWING INFORMATION", which is a continuation of and claims priority to U.S. patent application Ser. No. 13/846,908, filed Mar. 18, 2013, now U.S. Pat. No. 8,808,114 and titled "SYSTEMS AND METHODS FOR MEASURING AND/OR ANALYZING SWING INFORMATION", which is a continuation of and claims priority to U.S. patent application Ser. No. 12/696,040, filed Jan. 28, 2010, now U.S. Pat. No. 8,430,770 and titled "SYSTEMS AND METHODS FOR MEASURING AND/OR ANALYZING SWING INFORMATION", which claims priority to U.S. Provisional Patent Application Ser. No. 61/148,028, filed Jan. 28, 2009 and titled "SYSTEMS AND METHODS FOR MEASURING AND/OR ANALYZING SWING INFORMATION", and which is a continuation-in-part of and claims priority to U.S. patent application Ser. No. 11/869,695, filed Oct. 9, 2007, now U.S. Pat. No. 8,337,335 and titled "SYSTEMS AND METHODS FOR MEASURING AND/OR ANALYZING SWING INFORMATION", which claims priority to U.S. Provisional Patent Application Ser. No. 60/828,635, filed Oct. 7, 2006 and titled "SYSTEMS AND METHODS FOR MEASURING AND/OR ANALYZING SWING INFORMATION", each of which is hereby incorporated by reference herein in its entirety.

The present application is also related to U.S. Pat. No. 6,045,364, issued Apr. 4, 2000, which is hereby incorporated by reference herein in its entirety.

FIELD OF THE INVENTION

The present invention relates to the use of wireless devices for improving a swing such as a golf swing, a tennis swing, etc., and more particularly to systems and methods for measuring and/or analyzing swing information.

BACKGROUND OF THE INVENTION

A difficult challenge in swing intensive sporting activities (e.g., golf or tennis) is to perfect a swing and repeat it consistently. The pace of a swing, also known as swing tempo, is an important factor in most swing intensive activities as proper swing tempo is indicative of proper body position and proper body motion. In golf, for example, proper golf swing tempo ensures that golf club head velocity and golf club head position are optimized during a golf swing. As such, a device which assists a golfer in consistently repeating proper swing tempo can be an invaluable teaching aid or training device.

To be effective, a swing tempo training device should provide "real-time" feedback (e.g., sufficiently instantaneous and continuous to allow modification of a swing during the swing). Real-time feedback provides real-time information which allows a person to know during a swing whether swing tempo should be increased, decreased, or maintained.

A need therefore exists for a swing tempo training device which may provide real-time feedback, preferably without disturbing others and without creating artificial vibrations during a swing.

DETAILED DESCRIPTION

Golf Embodiment

In accordance with one or more embodiments of the invention, a system is provided for monitoring golf performance and/or play. The golf monitoring system may be employed to monitor swing performance during golf play, including swing tempo, swing velocity, ball-club contact force, and/or the like. In some embodiments, each golf club to be employed by a golfer is equipped with an accelerometer and a Bluetooth™ or other wireless transmitter. Each accelerometer may be positioned on or in a golf club and employed to measure acceleration of the golf club during a golf swing. This acceleration may be used to determine swing tempo, swing velocity, ball-club contact and/or contact force, number of strokes of the golfer, and the like, predict ball travel distance and/or position, etc. A Bluetooth™ or other wireless transmitter may receive an acceleration signal, such as a voltage or current level, from the accelerometer and transmit information regarding the acceleration signal to a wireless device such as a cellular telephone, a personal digital assistant (PDA), an MP3 player, a portable game player, or the like.

In one or more embodiments, the wireless device includes software, such as computer program code and/or one or more computer program products, adapted to monitor and/or process the information transmitted by the Bluetooth™ or other wireless transmitter coupled to each golf club. For example, the wireless device may employ the information received from each wireless transmitter to determine (1) the type of golf club being used (e.g., a wood, an iron, a 9 iron, a putter, etc., such as by associating an identifier of a wireless transmitter with a particular club); (2) the acceleration of the club during a swing (e.g., club head acceleration); (3) the velocity and/or speed of the club during a swing (4) swing tempo; (5) ball-club contact; (6) ball-club contact force; (7) ball-club contact timing; (8) follow through speed, timing and/or tempo; (9) number of strokes of the golf club and/or golfer; (10) predicted ball travel distance (e.g., based on ball-club contact force, club type, swing speed, etc.); (11) predicted ball position (e.g., based on ball-club contact force, club type, swing speed, etc.); (12) golf score; (13) golf handicap; and/or any other similar information.

In one particular embodiment, each golf club in a golfer's golf bag may include an accelerometer and a Bluetooth™ transmitter that are "paired" or otherwise configured to communicate with a cellular telephone such as a Palm® Treo™ or other cellular telephone. During golf play, the cellular telephone may monitor and/or analyze each swing of a golfer to determine, record, display and/or otherwise manipulate swing data of the golfer (e.g., to determine any of (1)-(13) above, or any other relevant information). For example, the cellular telephone may track number of swings for each golf hole. In some embodiments, the cellular telephone may prompt a golfer to indicate when a swing is a practice swing, and should not be counted toward a golf score (e.g., by pressing a key on the cellular telephone, speaking a command, etc.). The cellular telephone may graph or chart swing information, compare the same to historical information about the golfer's swings or the swings of an instructor or golf pro (e.g., swing tempo, club velocity and/or speed, ball-club contact force, etc). Numerical acceleration and/or speed, ball-club contact force, etc., may also be provided, so as to allow a golfer to easily compare his/her swing data to that of other golfers. In some embodiments, this information is stored and then analyzed by a third-party, such as a golf professional. In some embodiments, this information is automatically relayed to a third-party via the internet or any other suitable means. In some embodiments, a wireless device may be paired or otherwise configured to receive swing and/or club information from multiple golfers (e.g., to track the golf score or other swing statistics of a group of golfers). As stated, other wireless transmitters and/or wireless devices may be employed.

Tennis Embodiment

In accordance with one or more other embodiments of the invention, a system is provided for monitoring tennis performance and/or play. The tennis monitoring system may be employed to monitor swing performance during tennis play, including swing tempo, swing velocity, ball-racquet contact force, and/or the like. In some embodiments, a tennis racquet to be employed by a tennis player is equipped with an accelerometer and a Bluetooth™ or other wireless transmitter. Each accelerometer may be positioned on or in a tennis racquet and employed to measure acceleration of the tennis racquet during a swing. This acceleration may be used to determine swing tempo, swing velocity, ball-racquet contact and/or contact force, number of swings of the tennis player, and the like, predict ball travel distance and/or position, etc. A Bluetooth™ or other wireless transmitter may receive an acceleration signal, such as a voltage or current level, from the accelerometer and transmit information regarding the acceleration signal to a wireless device such as a cellular telephone, a personal digital assistant (PDA), an MP3 player, a portable game player, or the like.

In one or more embodiments, the wireless device includes software, such as computer program code and/or one or more computer program products, adapted to monitor and/or process the information transmitted by the Bluetooth™ or other wireless transmitter coupled to a tennis racquet. For example, the wireless device may employ the information received from a wireless transmitter to determine (1) the type of racquet being swung; (2) the acceleration of the racquet during a swing; (3) the velocity and/or speed of the racquet during a swing (4) swing tempo; (5) ball-racquet contact; (6) ball-racquet contact force; (7) ball-racquet contact timing; (8) follow through speed, timing and/or tempo; (9) number of swings of the racquet; (10) predicted ball travel distance (e.g., based on ball-racquet contact force, racquet type, swing speed, etc.); (11) predicted ball position (e.g., based on ball-racquet contact force, racquet type, swing speed, etc.); and/or any other similar information.

In one particular embodiment, a tennis racquet may include an accelerometer and a Bluetooth™ transmitter that are "paired" or otherwise configured to communicate with a cellular telephone such as a Palm® Treo™ or other cellular telephone. During tennis play, the cellular telephone may monitor and/or analyze each swing of a tennis player to determine, record, display and/or otherwise manipulate swing data of the tennis player (e.g., to determine any of (1)-(11) above, or any other relevant information). For example, the cellular telephone may track number of swings for a point, set, game, etc. In some embodiments, the cellular telephone may prompt a tennis player to indicate when a swing is a practice swing, and should not be counted (e.g., by pressing a key on the cellular telephone, speaking a command, etc.). The cellular telephone may graph or chart swing information, compare the same to historical information about the player's swings or the swings of an instructor or tennis pro (e.g., swing tempo, racquet velocity and/or speed, ball-racquet contact force, etc). Numerical acceleration and/or speed, ball-racquet contact force, etc., may also be provided, so as to allow a player to easily compare his/her swing data to that of other tennis players. In some embodiments, a wireless device may be paired or otherwise configured to receive swing and/or racquet information from multiple tennis players (e.g., to track the score or other swing statistics of a group of tennis players, such as two or more tennis players during a tennis game). As stated, other wireless transmitters and/or wireless devices may be employed.

In general, any swinging device may be similarly equipped, such as a hockey stick, a racquet ball racquet, a boxing glove, a kick boxer's leg, etc. For example, the number and/or force of punches during a boxing match may be monitored and/or analyzed.

First Exemplary Swing Measurement and/or Analysis Network

Figure 1:
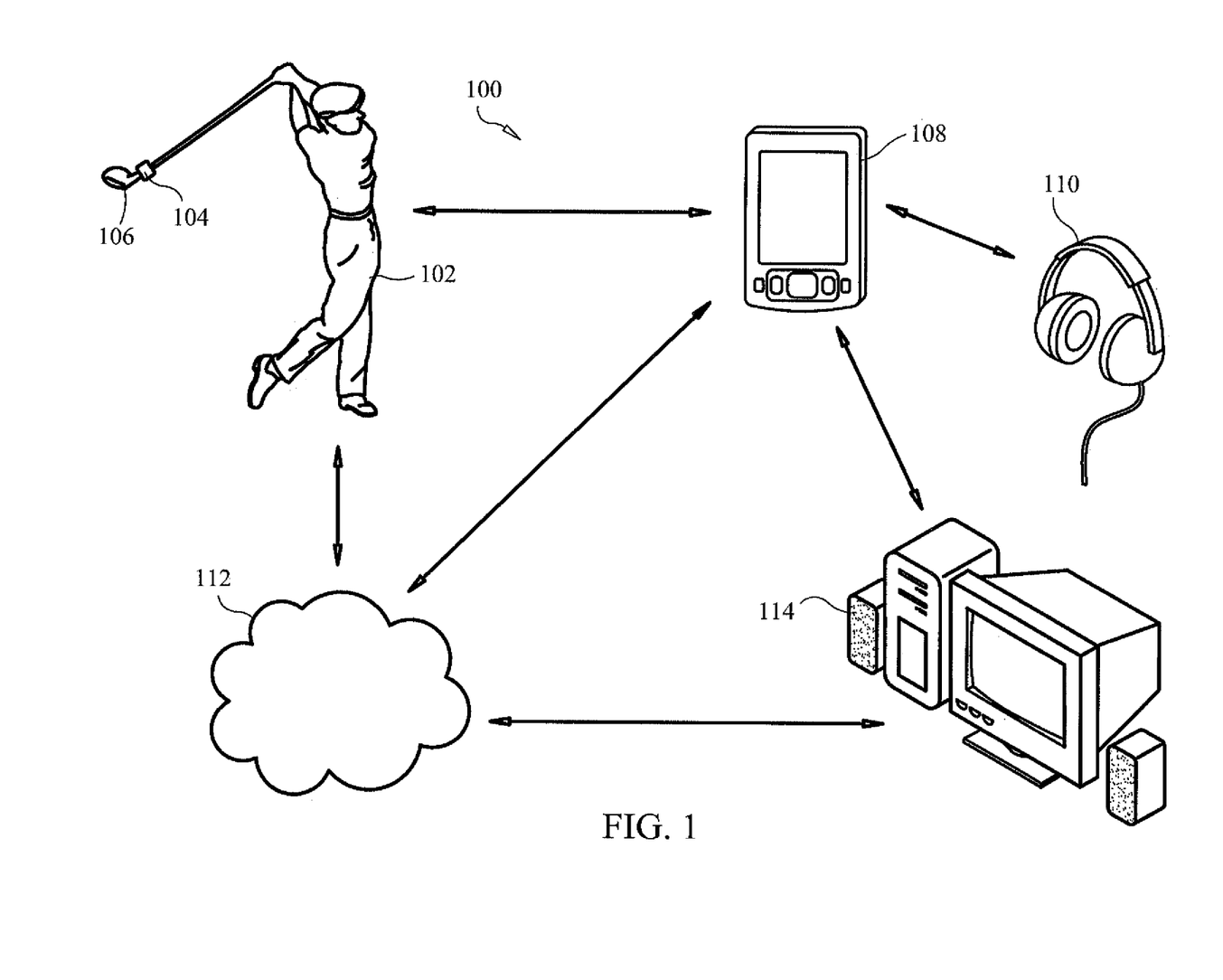
FIG. 1 is a diagram of exemplary components of an illustrative swing training device network provided in accordance with the present invention.

Use of a wireless device in a swing measurement and/or analysis network 100 in accordance with the present invention is illustrated in FIG. 1. With reference to FIG. 1, a user 102, such as a golfer, may employ a swing measurement device 104 to measure swing information of a swinging sports object, such as a golf club 106. In some embodiments, the swing measurement device 104 may be an accelerometer coupled to a wireless transmitter or any other suitable device for measuring and transmitting swing information of a swinging sports object. The swing measurement device 104 may be, for example, located on and/or in the swinging sports object, and is adapted to send signals (e.g., via a Bluetooth™ or other transmitter) indicative of the swing information (e.g., club acceleration, speed and/or velocity, swing tempo, club-ball impact force, etc.) to a wireless device 108.

In some embodiments, based on the received signals, the wireless device 108 may output auditory cues indicative of swing information to headphones 110. For tracking purposes, the swing measurement device 104 may be adapted to send swing information to the Internet 112, which may in turn transfer that information to the user's or another computer 114. Wireless device 108 may also transfer information to the computer 114, either directly, or through the Internet 112.

In one or more embodiments, the user 102 may use the swing measurement device 104 to measure swing tempo. In an exemplary embodiment, the swing measurement device 104 may comprise an accelerometer which outputs a voltage signal based on measured acceleration of the swinging object, a voltage-to-frequency converter coupled to the accelerometer which produces an audio signal in response to the voltage signal, and a wireless transmitter which transmits the audio signal to the wireless device 108 and/or the headphones 110. In another embodiment, the swing measurement device 104 may comprise an accelerometer that produces an output signal based on the acceleration of the swinging object, and a wireless transmitter that transmits the output signal to the wireless device 108. The wireless device 108 then may convert the output signal into an audio signal (e.g., via software) for output by the wireless device 108 and/or for transmission to and output by the headphones 110. Other appropriate swing measurement devices may be used.

Wireless device 108 may be any wireless device that is capable of receiving the signals transmitted from the swing measurement device 104 (e.g., by supporting Bluetooth™, WiFi, or similar technology). An exemplary wireless device may be, for example, a cellular telephone, web-enabled device (e.g., web-enabled cellular telephone or PDA), portable web browser, cellular or web-enabled wrist watch, web-enabled or otherwise portable gaming device (e.g., Sony PSP®, Nintendo DS™, etc.), or any other suitable device. The wireless device 108 may be capable of receiving, transmitting, storing, compiling, logging, tabulating, and/or analyzing swing information received from the swing measurement device 104 employed by the user 102.

Headphones 110 may be any conventional listening device adapted to receive wireless (e.g., Bluetooth™), wired or similar signals. Similarly, connectivity to the Internet 112 and/or the computer 114 from the swing measurement device 104 and/or wireless device 108 may be made via Bluetooth™, WiFi, or similar signals.

Figure 2:
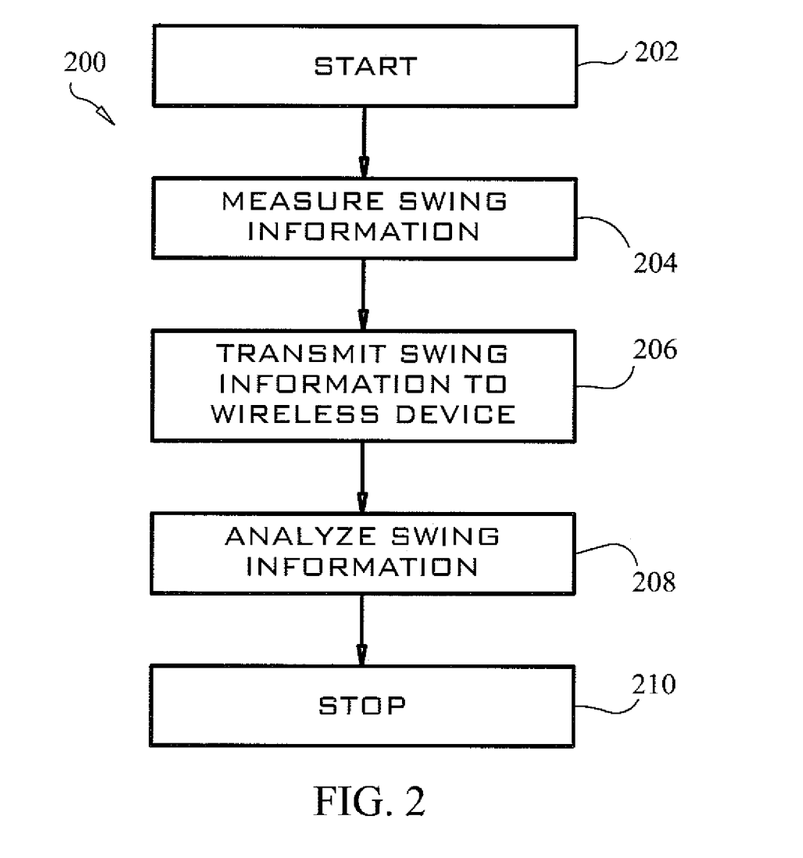
FIG. 2 is a flow chart of an exemplary method of using a wireless swing monitoring device provided in accordance with the present invention.

FIG. 2 depicts an exemplary method 200 of using the wireless device 108 and the swing measurement device 104 according to some aspects of the present invention. The method 200 begins at step 202.

In operation, the user 102 swings a club with a swing measurement device 104 attached or included therein, such as a wirelessly-enabled (e.g., Bluetooth™ enabled) accelerometer. Swing information (e.g., swing tempo or any other information) is measured at step 204, preferably in real time, by the swing measurement device 104.

At step 206, the swing information is communicated to the wireless device 108 (e.g., a cellular telephone, a PDA, etc.). In certain embodiments, the wireless device 108 may transmit swing information to another device (e.g., headphones, the Internet, a computer, etc.); in the same or alternative embodiments, the swing information may be transmitted directly to the other device from the swing measurement device 104.

In an exemplary embodiment, the wireless device 108 may send a real time audio signal indicative of swing tempo to headphones 110. In this way, the user 102 may privately listen to an auditory representation of the swing tempo and adjust the swing tempo of his/her swing without disturbing other golfers. Similarly, the wireless device 108 may transmit the audio signal to an iPod, personal mp3 player, or similar audio device. The signal may be recorded for future playback and/or played live via attached headphones or speakers so the user 102 may hear the tempo of the swing. In some embodiments, the audio signal may be transmitted directly from a Bluetooth™ enabled club to the audio device.

Figure 3A:
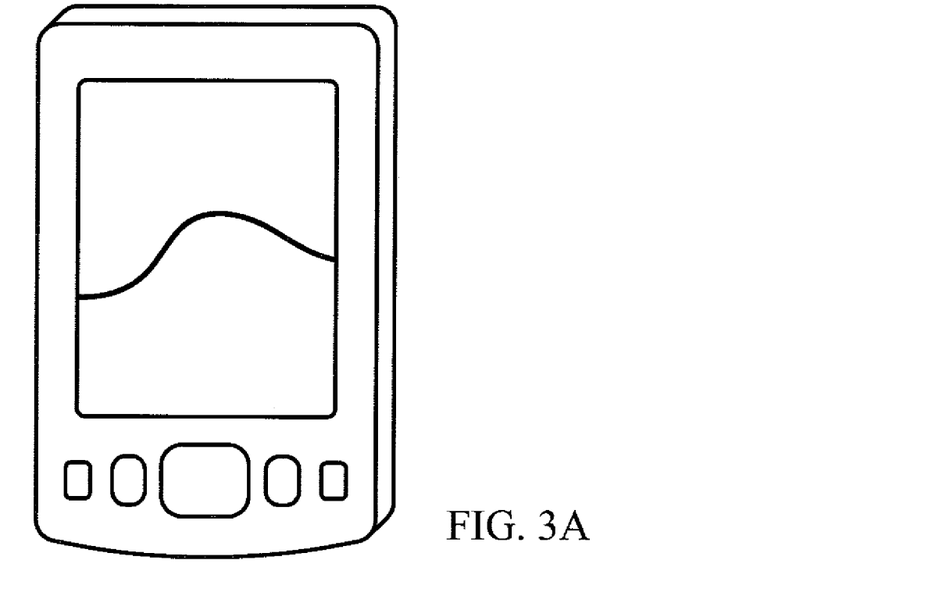
FIGS. 3A and 3B are illustrative exemplary wireless swing training devices in accordance with some embodiments of this invention.

In step 208, the wireless device 108 may analyze the swing information. For example, the wireless device 108 may display a graphical representation of the swing information (e.g., swing tempo, club head speed, velocity and/or acceleration, club-ball contact force and/or time, etc.) on a screen or other display of the wireless device 108. An example of such a representation is shown in FIG. 3A. The user 102 may then visually analyze the swing after it is completed and/or allow another user (e.g., a coach or caddy) to evaluate the swing in progress. In some embodiments, the graphical representations may be stored in a database of swings. The swings may then be reviewed and/or overlayed to closely compare any variations in swings. For example, a reference or ideal drive swing tempo may be loaded into a database on wireless device 108.

Database storage and/or tracking may also occur at computer 114 or on the Internet 112 (e.g., at a Web server of a golf related Web site). Each time the user 102 swings, swing information may be recorded and/or displayed graphically over reference swing information and/or previous swings. Preferably, the wireless device 108 is a small, hand-held device the user 102 may carry on his/her person (e.g., a cellular telephone, a PDA, etc.). In this way, the user 102 may see where a swing may be adjusted to realize an optimal swing while on the golf course (or other playing field for alternative swing applications such as tennis).

In some embodiments, the wireless device 108 may track the current swing and output a cue if the swing varies greatly from an ideal swing. For example, if the user 102 is exceeding the necessary swing tempo at the top of the swing, the wireless device 108 may vibrate and/or emit a tone. In this way, the user 102 will be alerted to the error and may stop the swing before ball contact.

In a similar fashion, the wireless device 108 may output a cue if the swing is ideal or very good. For example, if the measured tempo from a swing start through contact with the ball to the follow through indicates a good drive, the wireless device 108 may send a text message to a predetermined list of persons or otherwise alert others that the user 102 hit a good drive. The wireless device 108 may also calculate an approximate or anticipated drive distance based on the measured swing information and report this to the user 102 and/or include this information in the sent message.

In some embodiments, swing information received at the wireless device 108, Internet 112, and/or computer 114 may be tracked in a tracking program. The information may be transmitted via wired and/or wireless signals over the Internet 112 and/or transmitted directly to a personal computer 114, golf computer, or other device with golf tracking software loaded thereon.

In some embodiments, the wireless device 108 may track swing information and may additionally track the score for a user's game. For example, swing measurement devices (e.g., accelerometers) may be attached to (or in) each of the user's 102 clubs and/or may be easily transferred therebetween. In such embodiments, the swing measurement devices may be sufficiently small and light so as to not impede or otherwise hamper the swing of the user 102. The wireless device 108 may track the number of swings (strokes) taken by the user 102 using some or all clubs. In some embodiments, the wireless device 108 may differentiate between practice swings and strokes by determining the amount and/or speed of deceleration at ball-contact and/or the end of the stroke. For example, in a completed stroke, there may be a noticeable change in the swing tempo at the point of contact with the ball, indicating a stroke whereas in a practice swing, a swing tempo change may be reduced and/or may not be present. The user 102 may also input penalties into the wireless device 108 which would not normally be recorded otherwise. Using the total score for a round or rounds, the wireless device 108 may also calculate a user's 102 handicap.

In some embodiments, especially when more than one user 102 employs the wirelessly-enabled clubs and wireless device 108, the wireless device 108 may track various types of games and/or propositions. For example, the wireless device 108 may track the scores of an entire foursome or even a tournament. Different types of play may be accommodated, such as match play, skins games, and/or best ball tournaments. In some embodiments, the wireless device 108 may be capable of calculating an approximate landing position of the ball based on swing information and compare this estimation to other users. In this way, ball position may be tracked on a golf course and an estimation of the most appropriate ball to hit in a best ball or scramble-type game may be determined.

Figure 3B:
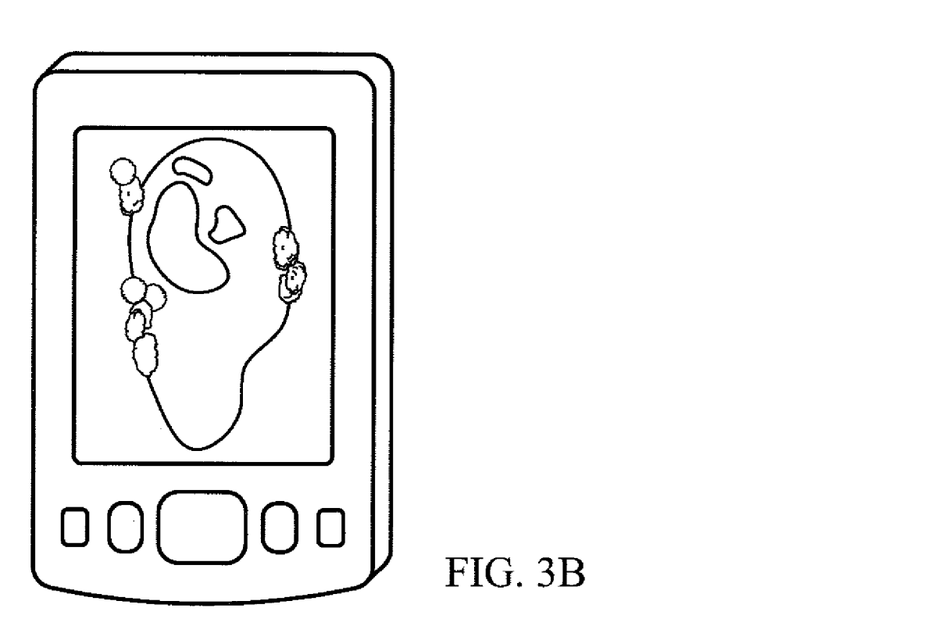

To further aid a user 102 to track a golf game, the wireless device 108, clubs, and/or ball may be GPS equipped. In this way, the user 102 may have real time accurate information of where the user 102 is in relation to a ball, a pin, the 19th hole, etc. FIG. 3B represents an example of a golf mapping program which may be used in conjunction with the present invention. Golf mapping programs are commercially available from, for example, Golfwits, LLC of Lynden, Wash. and StarCaddy, manufactured by LinksPoint of Norwalk, Conn.

Used in coordination, the present invention and golf course mapping software may provide useful tools to a user. For example, a GPS enabled wireless device may track the movements of the user and provide information such as location on the course, distance to hole, etc. Based on swing tempo, other swing information and/or course terrain downloaded from the course map, the wireless device 108 may calculate an approximate landing location of a ball after a swing. This tentative landing location may be plotted on the golf course mapping software and the user may utilize the GPS capabilities to find the golf ball. This may be especially useful with errant shots or blind turns. The wireless device 108 may also suggest shots and clubs based on a record of previous swings (e.g., prior swing measurements such as prior swing tempo achievement). For example, if the user is not achieving a certain swing tempo, indicating an inability to hit high or long shots, the wireless device 108 may suggest a two shot approach to a dogleg instead of attempting to fly over. Additionally, based on terrain and location on the map, the wireless device 108 may calculate an alternate swing tempo or other swing adjustment for the user. This alternate swing may help the golfer hit a further and/or more accurate shot or may encourage a shorter shot or lay-up.

The method ends at step 210.

Second Exemplary Swing Measurement and/or Analysis Network

Figure 4A:
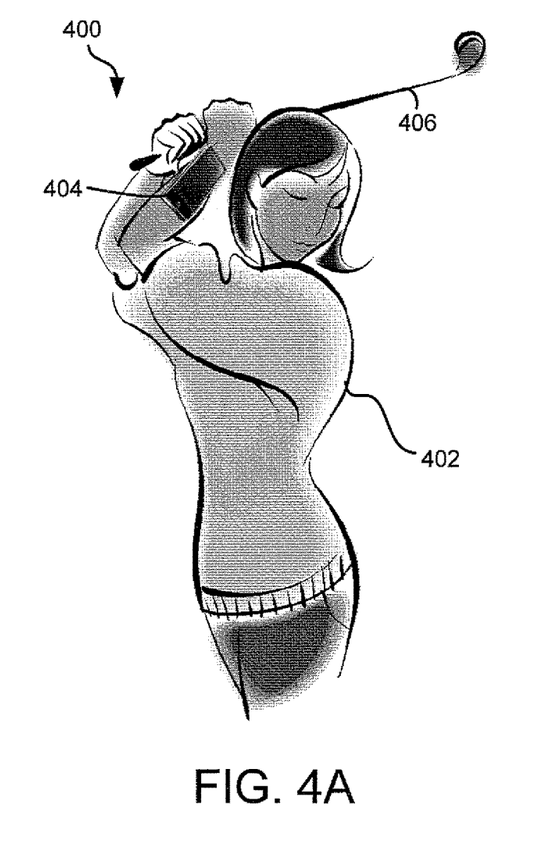
FIGS. 4A-C illustrate some exemplary components of an alternative swing training device network provided in accordance with the present invention.
Figure 4B:
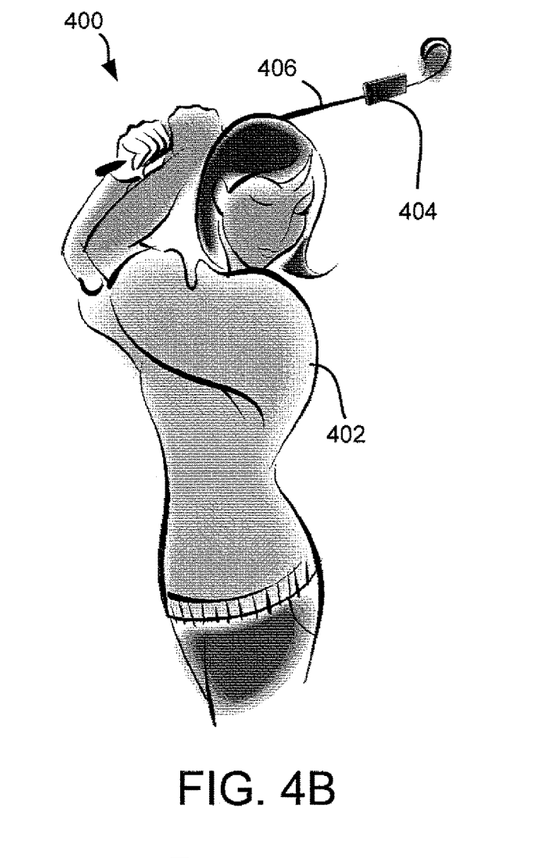
Figure 4C:
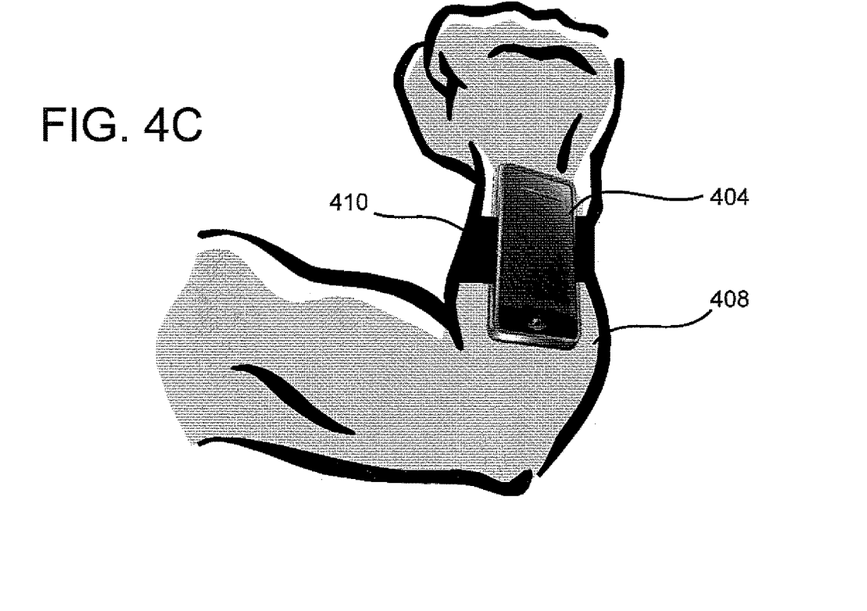

Use of a wireless device in a second swing measurement and/or analysis network 400 in accordance with the present invention is described with reference to FIGS. 4A-C. With reference to FIG. 4A, a user 402, such as a golfer, may employ a wireless device 404 to measure swing information of a swinging object, such as a golf club 406. In some embodiments, the wireless device 404 may include one or more accelerometers that may be employed for measuring swing information of a swinging object. The wireless device 404 may be, for example, located on the user 402 (FIG. 4A) such as on a wrist or forearm, or located on and/or in the swinging object (FIG. 4B). In one particular embodiment shown in FIG. 4C, the wireless device 404 may be coupled to an arm 408 of the user 402 via a strap 410 or any other suitable securing mechanism. The wireless device 404 may be similarly coupled to the shaft of the golf club 406.

In some embodiments, the wireless device 404 may output auditory cues indicative of swing information to headphones 110 (FIG. 1). For tracking purposes, the wireless device 404 may be adapted to send swing information to the Internet 112 (FIG. 1), which may in turn transfer that information to the user's or another computer 114 (FIG. 1). Wireless device 404 may also transfer information to the computer 114 directly or through the Internet 112.

In one or more embodiments, the user 402 may use the wireless device 404 to measure swing tempo. In an exemplary embodiment, the wireless device 404 may include an accelerometer and the wireless device 404 may convert measured acceleration into an audio signal (e.g., via software) for output by the wireless device 404 and/or for transmission to and output by the headphones 110 (FIG. 1).

Wireless device 404 may be any wireless device that is capable of measuring a characteristic of a swinging object. An exemplary wireless device may be, for example, a cellular telephone, web-enabled device (e.g., web-enabled cellular telephone or PDA), portable web browser, web-enabled or otherwise portable gaming device (e.g., Sony PSP®, Nintendo DS™, etc.) that includes one or more accelerometers, or any other suitable device. The wireless device 404 may be capable of receiving, transmitting, storing, compiling, logging, tabulating, and/or analyzing swing information.

Headphones 110 may be any conventional listening device adapted to receive audio signals from the wireless device 404. Similarly, connectivity to the Internet 112 and/or the computer 114 from the wireless device 404 may be made via Bluetooth™, WiFi, or similar signals.

Figure 5:
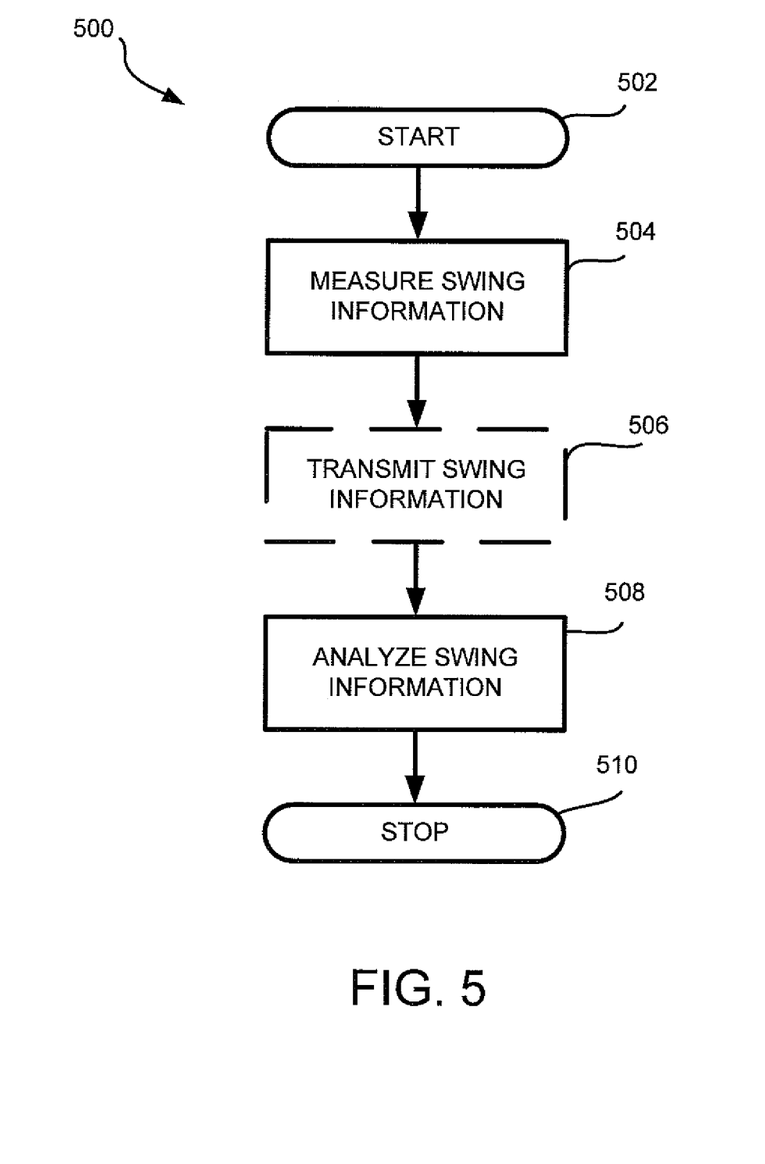
FIG. 5 is a flow chart of an alternative exemplary method of using a wireless swing monitoring device provided in accordance with the present invention.

FIG. 5 depicts an exemplary method 500 of using the wireless device 404 according to some aspects the present invention. The method 500 begins at step 502.

In operation, the user 402 swings a club with a wireless device 404 attached to the user 402 or attached to or included in the club. Swing information (e.g., swing tempo or any other information) is measured at step 504, preferably in real time, by the wireless device 404.

In some embodiments, at step 506, the swing information may be communicated by the wireless device 404 (e.g., a cellular telephone, a PDA, etc.). In certain embodiments, the wireless device 404 may transmit swing information to another device (e.g., headphones, the Internet, a computer, etc.).

In an exemplary embodiment, the wireless device 404 may send a real time audio signal indicative of swing tempo to headphones 110. In this way, the user 402 may privately listen to an auditory representation of the swing tempo and adjust the swing tempo of his/her swing without disturbing other golfers. The signal may be recorded for future playback and/or played live via attached headphones or speakers so the user 402 may hear the tempo of the swing.

In step 508, the wireless device 404 may analyze the swing information. For example, the wireless device 404 may display a graphical representation of the swing information (e.g., swing tempo, club head speed, velocity and/or acceleration, club-ball contact force and/or time, etc.) on a screen or other display of the wireless device 404. An example of such a representation is shown in FIG. 3A. The user 402 may then visually analyze the swing after it is completed and/or allow another user (e.g., a coach or caddy) to evaluate the swing. In some embodiments, the graphical representations may be stored in a database of swings. The swings may then be reviewed and/or overlayed to closely compare any variations in swings. For example, a reference or ideal drive swing tempo may be loaded into a database on wireless device 404.

Database storage and/or tracking may also occur at computer 114 or on the Internet 112 (e.g., at a Web server of a golf related Web site). Each time the user 402 swings, swing information may be recorded and/or displayed graphically over reference swing information and/or previous swings. Preferably, the wireless device 404 is a small, hand-held device the user 402 may carry on his/her person (e.g., a cellular telephone, a PDA, etc.). In this way, the user 402 may see where a swing may be adjusted to realize an optimal swing while on the golf course (or other playing field for alternative swing applications such as tennis).

In some embodiments, the wireless device 404 may track the current swing and output a cue if the swing varies greatly from an ideal swing. For example, if the user 402 is exceeding the necessary swing tempo at the top of the swing, the wireless device 404 may vibrate and/or emit a tone. In this way, the user 402 will be alerted to the error and may stop the swing before ball contact.

In a similar fashion, the wireless device 404 may output a cue if the swing is ideal or very good. For example, if the measured tempo from a swing start through contact with the ball to the follow through indicates a good drive, the wireless device 404 may send a text message to a predetermined list of persons or otherwise alert others that the user 102 hit a good drive. The wireless device 404 may also calculate an approximate or anticipated drive distance based on the measured swing information and report this to the user 402 and/or include this information in the sent message.

In some embodiments, the volume of the tone of the wireless device 404 may also be correlated with the swing of the user 402. The sound emitted by the wireless device 404 may be correlated to different aspects of the swing, such as swing acceleration, duration of the swing, "jerkiness" (i.e. changes in acceleration), etc.

In some embodiments, swing information may be tracked in a tracking program. The information may be transmitted via wired and/or wireless signals over the Internet 112 and/or transmitted directly to a personal computer 114, golf computer, or other device with golf tracking software loaded thereon.

In some embodiments, the wireless device 404 may track swing information and may additionally track the score for a user's game. The wireless device 404 may track the number of swings (strokes) taken by the user 402 using some or all clubs. In some embodiments, the wireless device 404 may differentiate between practice swings and strokes by determining the amount and/or speed of deceleration at ball-contact and/or the end of the stroke. For example, in a completed stroke, there may be a noticeable change in the swing tempo at the point of contact with the ball, indicating a stroke whereas in a practice swing, a swing tempo change may be reduced and/or may not be present. The user 402 may also input penalties into the wireless device 404 which would not normally be recorded otherwise. Using the total score for a round or rounds, the wireless device 404 may also calculate a user's 402 handicap.

In some embodiments, especially when more than one user 402 participates, the wireless device 404 may track various types of games and/or propositions. For example, the wireless device 404 may track the scores of an entire foursome or even a tournament. Different types of play may be accommodated, such as match play, skins games, and/or best ball tournaments. In some embodiments, the wireless device 404 may be capable of calculating an approximate landing position of the ball based on swing information and compare this estimation to other users. In this way, ball position may be tracked on a golf course and an estimation of the most appropriate ball to hit in a best ball or scramble-type game may be determined.

To further aid a user 402 to track a golf game, the wireless device 404, clubs, and/or ball may be GPS equipped. In this way, the user 402 may have real time accurate information of where the user 402 is in relation to a ball, a pin, the 18th hole, etc. FIG. 3B represents an example of a golf mapping program which may be used in conjunction with the present invention. Golf mapping programs are commercially available from, for example, Golfwits, LLC of Lynden, Wash. and StarCaddy, manufactured by LinksPoint of Norwalk, Conn. Used in coordination, the present invention and golf course mapping software may provide useful tools to a user. For example, a GPS enabled wireless device may track the movements of the user and provide information such as location on the course, distance to hole, etc.

Based on swing tempo, other swing information and/or course terrain downloaded from the course map, the wireless device 404 may calculate an approximate landing location of a ball after a swing. For instance, the wireless device 404 may calculate a projected trajectory and distance of the ball. The wireless device may then determine the position of the ball relative to the position of the original shot of the user 402. The wireless device 404 may then mark where the ball most likely landed on the map. This tentative landing location may be plotted on the golf course mapping software and the user may utilize the GPS capabilities to find the golf ball. This may be especially useful with errant shots or blind turns. The wireless device 404 may also suggest shots and clubs based on a record of previous swings (e.g., prior swing measurements such as prior swing tempo achievement). For example, if the user is not achieving a certain swing tempo, indicating an inability to hit high or long shots, the wireless device 404 may suggest a two shot approach to a dogleg instead of attempting to fly over. Additionally, based on terrain and location on the map, the wireless device 404 may calculate an alternate swing tempo or other swing adjustment for the user. This alternate swing may help the golfer hit a further and/or more accurate shot or may encourage a shorter shot or lay-up.

The method ends at step 510.

In some embodiments, several wireless devices 404 are used. The wireless devices 404 may be able to communicate with one another directly, or via the internet. Information may be shared between the wireless devices 404. In some embodiments, the location of other users 402 may be displayed on the wireless device 404. For instance, a wireless device 404 may determine its own location using GPS or any other suitable means, and communicate this position to other wireless devices 404. Based upon this information, distances between players and probabilities of hitting other users 402 with the ball may be calculated by the wireless device 404.

In some embodiments, a wireless device 404 may track the score of a user 402, and transmit the score to another wireless device 404. As discussed above, the wireless device 404 may track swing information and may additionally track the score for the game of a user 402. This information may be communicated to other wireless devices 404 to provide automatic score updates to other wireless devices 404.

In some embodiments, a program to enable the above described features may be downloaded to a wireless device 404. While the wireless device 404 may be adapted to perform other functions (e.g., place a call or surf the Internet 112), the wireless device 404 may lack the software to perform the features described herein. A program which adapts the wireless device 404 to perform the functions described herein may be transmitted to a wireless device 404 via the Internet 112 or any other suitable means. The program is then saved to a computer readable medium on the wireless device 404. The user 402 may then install the program and begin using the features described herein. In some embodiments, the software is downloaded directly to a computer readable medium on the wireless device 404 and installed without any user 402 interaction.

In some embodiments, the user may enter information into wireless device 404. For instance, the user 402 may enter information relating to their skill level (e.g., novice or expert), conditions relating to the weather (e.g., wind direction and speed), the layout of the golf course (e.g., distance to the hole from the present location or tree locations) or performance on the last swing (e.g., if the ball hooked left or sliced left).

In some embodiments, the wireless device 404 may automatically search for information relevant to the game on the Internet. For instance, the wireless device 404 may search for prevailing weather conditions, such as force and direction of the wind. In some embodiments, the wireless device 404 may warn the user 402 of weather conditions that may adversely affect their game. For instance, the wireless device 404 may warn the user 402 if the weather forecast predicts a thunderstorm will reach the golf course during the game, if heat levels will exceed a comfortable playing temperature or become dangerous, or if high winds are predicted.

In some embodiments, the wireless device 404 may "learn" about the course. The user 402 may take a picture, or several pictures, of the current hole. Based upon the picture, or image, the wireless device 404 may determine the layout of hole, including trees, location of the hole, the green, sand traps and other features of the golf course. This information may also be downloaded from any suitable source as well.

In some embodiments, the wireless device 404 may provide feedback to the user 402 and act as a caddy or coach. For instance, if the user 402 consistently slices their ball to the left, the wireless device 404 may provide feedback to user 402 to correct the stroke of the user 402. The wireless device 404 may analyze the information it has accumulated on the user 402, to provide advice on a training regimen, provide inspirational phrases (e.g., "a few more strokes like that and you'll have it!" or "you've made 5,000 perfect or nearly perfect swings, another 5,000 and you will have the muscle memory to play like a professional"), notify the user that they have a lack of consistency/concentration and provide advice to overcome these flaws, coaching advice (e.g., when it is time to quit, how many balls to hit during practice, how to hit the balls, etc.), analyze and provide objective metrics reflecting progress toward developing muscle memory (e.g., 10,000 swings are required to develop the required muscle memory), objective metrics reflecting progress toward developing muscle strength, etc.

The wireless device 404 may also provide feedback on the best approach to the hole. The wireless device 404 may take many factors into account when determining the best approach, such as skill of the user, obstacles on the course, weather, etc. For instance, if a tree is in the way of a direct shot to the hole, the wireless device 404 may instruct the user 402 to take an alternative approach to the hole, rather than risk hitting the tree. The wireless device 404 may also determine that if the skill level of a user 402 is low, such as a beginner, a conservative approach should be taken rather than a riskier approach. For instance, if a tree is in the path of a direct approach, the wireless device 404 may provide feedback to a novice that an approach without trees should be taken and give the user 402 an alternative approach to the hole. If the wireless device 404 determines that the user 402 is more skilled, such as an expert, the wireless device 404 may instruct the user 402 to take a riskier approach to the hole, such as by hitting the ball over the tree.

As discussed above, in some embodiments, the wireless device 404 may determine the location of the hole and the user 402. Based upon this information, the wireless device 404 may determine the distance between the user 402 and the hole. Using the distance between the user 402 and the hole, the wireless device 404 may make a recommendation to the user 402 as to what club to use and a swing strength recommendation, such as how hard to hit the ball. Other factors, such as if the user is on the green or in a sand trap, may influence the club and swing strength recommendation of the wireless device 404.

In some embodiments, the wireless device 404 may communicate information, such as position of the user 402, to the golf clubhouse. Personnel at the golf clubhouse can track the position of the user 402 and the current hole the user 402 is playing. Based upon this information, the personnel may instruct other players to begin other courses if the user 402 is on a low hole. In some embodiments, if the user 402 is playing a hole high enough to ensure another player cannot overtake the user 402, the personnel may instruct the player to begin playing the course the user 402 is playing. The personnel may also begin to prepare food if the user 402 is on a sufficiently high hole, or prepare the checkout process (e.g., begin paperwork or retrieve the car of the user 402). The personnel may also send food or refreshments to the user 402 on specific holes or periodically.

In some embodiments, the wireless device 404 may respond to verbal commands. For instance, the user 402 may state "practice" to indicate the user 402 is about to take a practice swing.

The features described herein may be applicable to other sports such as tennis, baseball or soccer. In some embodiments, a baseball team may be equipped with specific wireless devices 104 or wireless devices 404. A commentator or coach can reference the position of the wireless device 104 or wireless device 404 and who is assigned to the wireless devices 104 or wireless device 404, in order to determine specific players and their locations. Based upon this information, a commentator can easily determine which player made a play, or each player's location. Furthermore, based upon this information a coach can instruct a player where to hit the ball for the highest chance of success. For instance, if a coach knows the best player on the opposing team is in center field, the coach can instruct their player to hit away from center field.

In some embodiments, the wireless device 104 or wireless device 404 may be embedded in sports equipment. For instance, the wireless devices 104 or wireless device 404 may be embedded in a bat, racquet or shin guard. For instance, if the user 102 or 402 is playing soccer, the wireless device 104 or wireless device 404 embedded in the shin guard may be used to indicate the player's running speed, movements throughout the game or total distance travelled and so forth. In some embodiments, this information may be used to determine the level of fatigue of a user 102 or 402. In other embodiments, the aspects of a player's swing (e.g., speed or direction) may be analyzed.

In some embodiments, the wireless device 404 may be used during martial arts training. The user 402 can clock the speed and timing of their movements to determine their ability level and how to progress. The user 402 can also use wireless device 404 to keep track of his/her movements and notify the user 402 when he/she has reached a predetermined threshold. For instance, during a speed drill, the user 402 may wish to determine how long it takes to throw one-hundred punches. The wireless device 404 can keep track of the number of punches and emit a sound when 100 punches have been thrown by the user 402. The wireless device 404 may also track the time it takes the user to reach his/her goals (e.g., throw one hundred punches). In some embodiments, the user 402 may wish to simply determine how many times he/she make a certain movement, such as kicking. The wireless device 404 can keep track of these movements and provide the results to the user 402 when convenient.

In some embodiments, the wireless device 404 may simulate a game. For instance, the wireless device 404 may simulate a golf game to create a "virtual" golf game. The user 402 may play various maps and course which are displayed to the user 402. In some embodiments, the user 402 may swing a "virtual" golf club by holding the wireless device 404 in his/her hands, and swinging the wireless device 404 as he/she would a golf club. In some embodiments, instead of the user 402 holding the wireless device 404, wireless device 404 may be attached to user 402 as the user simulates or actually hits a golf ball. The wireless device 404 measures characteristics of the swing (e.g., if the user pulled left or right during the swing, or strength of the swing, etc.) of the user 402. These characteristics are then used by the game to calculate where the user 402 hit the ball in the virtual golf course (e.g., on the green, sand trap or made it to the hole). This may continue until the user has finished the game.

In some embodiments, multiple wireless devices 404 may be connected together via the internet or any other suitable means to simulate a game. For instance, a first wireless device 404 may be keyed to the movements of player one, a second wireless device 404 may be keyed to the movements of player two, a third wireless device 404 may be keyed to the movements of player three and so forth. In some embodiments, a master wireless device 404 acts as a host, and may simulate the game, generate the maps of courses and so forth while other wireless devices connect to the master wireless device 404, and transmit information of the movement of the user 402 to the master wireless device 404. In some embodiments, the wireless devices 404 connect to one another directly without a host. In some embodiments, a wireless device 404 may connect to a suitable medium (e.g., computer or TV) to display the game. Any suitable means, such as the internet, USB cables or AV cables may be used to connect the user device 404 to a suitable medium.

In some embodiments, multiple wireless devices 404 may be attached to the user 402. The wireless devices 404 may measure different aspects of the motion of the user 402. For instance, during a golf swing, the user may attach one wireless device 402 on his/her forearm, and another wireless device 404 on his/her hind leg. This may allow the user to not only measure characteristics of forearm movement, but also measure characteristics of hind leg movement. The characteristics of the hind leg movement of the user 402 may be used to determine the follow through of the swing of the user 402. Thus, another dimension of movement and game-play may be analyzed with each additional wireless device 404. Any number (1, 2, 3, 4 . . . ) of wireless devices 404 may be used. While the wireless device 404 is discussed as being placed on the hind leg of the user 402, the wireless device 404 may be placed anywhere on the body.

In some embodiments, the wireless device 404 may correlate movements (e.g., swinging a golf club or punch) to a number of calories burned. The wireless device 404 may keep track of the number of movements by the user 402 and determine the number of calories the user 402 has burned. The total number of calories may be presented to the user. An inspirational message to motivate the user to keep exercising may also be provided. Feedback may also be provided as well.

In some embodiments, the wireless device 404 may be adapted to determine the speed the user 402 is traveling. For instance, the user 402 may activate the wireless device 404 before going on a roller coaster ride so they may determine the speeds the user 402 travelled during the roller coaster ride. The wireless device may also measure "jerkiness" of a ride, or the changes in acceleration that occur throughout the ride. In some embodiments, the wireless device 404 may determine the speed the user is traveling in a vehicle, such as a car. This information may be saved in the wireless device 404. This information may be retrieved at a later time. For instance, if the user 402 gets into an accident, personnel, such as officers, can determine factors before the crash, such as how fast the car was travelling upon impact, the direction of travel and the GPS location of the wireless device 404 before the accident. In other embodiments, an auto-alert is set up on the wireless device 404 to notify appropriate parties, such as parents of a user 402, if a predetermined speed is exceeded. In some embodiments, appropriate parties can monitor the speed of the wireless device 404 in real time. In other embodiments, the wireless device 404 may sync with the stereo of the vehicle. The wireless device 404 may select music (e.g., faster music for faster ride, slower music for a slower ride), based upon the speed of the user. In some embodiments, the wireless device 404 may select music for a roller coaster ride and play this music to the user 402. For instance, rock and roll may be played during a steep plummet. In some embodiments, as the speed increases, so does the intensity and loudness of the music. In some embodiments, instead of, or in conjunction with speed, G-forces may also be correlated to music.

The foregoing description discloses only exemplary embodiments of the present invention. Modifications of the above disclosed apparatus and methods which fall within the scope of the invention will be readily apparent to those skilled in the art. Specific components may be substituted with equivalent components and the number of components may be increased or reduced and still remain within the scope of the present invention. A swing measurement apparatus may be employed for teaching proper swing (e.g., swing tempo) for a tennis racket, baseball bat or hockey stick, to teach proper casting during fly fishing, proper tempo during bowling, and to monitor the velocity of a baseball player's throwing arm. Further, a boxer or martial artist may use the apparatus to monitor the velocity and/or acceleration (and thus the force) of punches or kicks. Additionally, any modulation and transmission scheme may be used for transmitting information to remote locations.

Also, although discussed primarily with regard to Bluetooth™ technology, it is understood that signals may be sent to and/or from the swing measurement device, wireless device, and other devices via other means, such as Short Message Service, IEEE 802.11b (WiFi), Ultra Wide Band (UWB), WiMax, etc. Additionally, while the present invention has primarily been described with reference to a single user, it will be understood that the invention is equally applicable to multiple user situations.

Accordingly, while the present invention has been disclosed in connection with exemplary embodiments thereof, it should be understood that other embodiments may fall within the spirit and scope of the invention, as defined by the following claims.

What is claimed is:

1. A system for monitoring a golf swing comprising:
a mobile telephone having one or more accelerometers and a program stored therein that when executed by the mobile telephone causes the mobile telephone to:
monitor acceleration of the mobile telephone as the mobile telephone swings;
collect acceleration information based on the monitored acceleration of the mobile telephone as the mobile telephone swings;
analyze the collected acceleration information to determine one or more characteristics of a golf swing based on the collected acceleration information;
output information regarding the one or more characteristics of the golf swing on a display of the mobile telephone; and
provide feedback to correct the golf swing.

2. The system of claim 1, wherein the program causes the mobile telephone to provide feedback to a user to correct the golf swing.

3. The system of claim 1, wherein the program causes the mobile telephone to provide feedback to correct slicing.

4. The system of claim 1, wherein the program causes the mobile telephone to accumulate information on a user.

5. The system of claim 4, wherein the program causes the mobile telephone to provide advice on a training regimen based on the accumulated information.

6. The system of claim 4, wherein the program causes the mobile telephone to provide phrases to the user based on the accumulated information.

7. The system of claim 4, wherein the program causes the mobile telephone to notify the user that the user has a lack of consistency based on the accumulated information.

8. The system of claim 4, wherein the program causes the mobile telephone to notify the user that the user has a lack of concentration based on the accumulated information.

9. The system of claim 4, wherein the program causes the mobile telephone to provide coaching advice based on the accumulated information.

10. The system of claim 4, wherein the program causes the mobile telephone to provide advice on how to hit golf balls based on the accumulated information.

11. The system of claim 1, wherein the program causes the mobile telephone to provide feedback to a user to correct the golf swing.

12. The system of claim 1, wherein the program causes the mobile telephone to provide feedback to correct slicing.

13. The system of claim 1, wherein the program causes the mobile telephone to accumulate information on a user.

14. The system of claim 13, wherein the program causes the mobile telephone to provide advice on a training regimen based on the accumulated information.

15. The system of claim 13, wherein the program causes the mobile telephone to provide phrases to the user based on the accumulated information.

16. The system of claim 13, wherein the program causes the mobile telephone to notify the user that the user has a lack of consistency based on the accumulated information.

17. The system of claim 13, wherein the program causes the mobile telephone to notify the user that the user has a lack of concentration based on the accumulated information.

18. The system of claim 13, wherein the program causes the mobile telephone to provide coaching advice based on the accumulated information.

19. The system of claim 13, wherein the program causes the mobile telephone to provide advice on how to hit golf balls based on the accumulated information.

20. An application executable on a mobile telephone comprising:
a program configured to be stored in the mobile telephone and that when executed by the mobile telephone causes the mobile telephone to:
monitor acceleration of the mobile telephone as the mobile telephone swings using one or more accelerometers of the mobile telephone;
collect acceleration information based on the monitored acceleration of the mobile telephone;
analyze collected acceleration information to determine one or more characteristics of a golf swing;
output information regarding the one or more characteristics of the golf swing; and
provide feedback to correct the golf swing.

* * * * *